United States Patent
Klatt et al.

(10) Patent No.: US 7,113,959 B1
(45) Date of Patent: Sep. 26, 2006

(54) SYSTEM AND METHOD OF USING HUMAN RESOURCES DATA TO GENERATE PRINTED PRODUCTS

(75) Inventors: Cory Klatt, Edmonds, WA (US); Brent Krum, Redmond, WA (US)

(73) Assignee: Imagex, Inc., Kirkland, WA (US)

( * ) Notice: Subject to any disclaimer, the term of this patent is extended or adjusted under 35 U.S.C. 154(b) by 0 days.

(21) Appl. No.: 09/479,669

(22) Filed: Jan. 10, 2000

(51) Int. Cl.
G06F 17/30 (2006.01)
G06F 17/60 (2006.01)

(52) U.S. Cl. .................. 707/104.1; 707/1; 707/10; 705/7; 705/10

(58) Field of Classification Search .............. 705/10, 705/7; 707/1, 10, 104.1
See application file for complete search history.

(56) References Cited

U.S. PATENT DOCUMENTS

| | | |
|---|---|---|
| 4,817,043 A | 3/1989 | Brown |
| 4,839,829 A | 6/1989 | Freedman |
| 4,873,643 A | 10/1989 | Powell et al. |
| 5,036,472 A | 7/1991 | Buckley et al. |
| 5,056,029 A | 10/1991 | Cannon |
| 5,119,476 A | 6/1992 | Texier |
| 5,287,497 A | 2/1994 | Behera |
| 5,343,556 A | 8/1994 | Silverberg |
| 5,410,646 A | 4/1995 | Tondevold et al. |
| 5,446,653 A | 8/1995 | Miller et al. |
| 5,450,541 A | 9/1995 | Rourke et al. |
| 5,467,434 A | 11/1995 | Hower, Jr. et al. |
| 5,547,178 A | 8/1996 | Costello |
| 5,552,994 A | 9/1996 | Cannon et al. |
| 5,561,604 A | 10/1996 | Buckley et al. |
| 5,563,999 A | 10/1996 | Yaksich et al. ............ 707/507 |
| 5,579,447 A | 11/1996 | Salgado |
| 5,709,374 A | 1/1998 | Taylor et al. |
| 5,717,841 A | 2/1998 | Farrell et al. |
| 5,721,825 A | 2/1998 | Lawson et al. |
| 5,748,484 A | 5/1998 | Cannon et al. |
| 5,758,327 A | 5/1998 | Gardner et al. |
| 5,761,663 A | 6/1998 | Lagarde et al. |
| 5,778,367 A | 7/1998 | Wesinger, Jr. et al. |
| 5,793,964 A | 8/1998 | Rogers et al. |
| 5,808,894 A | 9/1998 | Wiens et al. |
| 5,844,554 A | 12/1998 | Geller et al. ............ 345/744 |
| 5,845,263 A | 12/1998 | Camaisa et al. |
| 5,893,911 A | 4/1999 | Piskiel et al. |
| 5,916,307 A | 6/1999 | Piskiel et al. |
| 5,930,810 A | 7/1999 | Farros et al. |

(Continued)

FOREIGN PATENT DOCUMENTS

WO        WO 98/08176        2/1998

OTHER PUBLICATIONS

Oracle Corporation, Oracle8i Application developer's guide-Fundamentals, Using Triggers, Copyright 1999, 44 pgs.

(Continued)

Primary Examiner—Frantz Coby
(74) Attorney, Agent, or Firm—Banner & Witcoff Ltd.

(57) ABSTRACT

Information stored in a corporate database is monitored and used to determine when certain business-related events have occurred. Event information is transmitted over the Internet to a print production facility, where it is used to fire one or more event rules, which in turn automatically generate print requisitions or print production orders. In one variation, print requisitions are routed through an existing and commercially available procurement system before a print production order is generated. The system can monitor and handle events from multiple corporations, each having its own business-related event rules, and each potentially having its own procurement approval system.

33 Claims, 15 Drawing Sheets

U.S. PATENT DOCUMENTS

| | | | |
|---|---|---|---|
| 5,937,393 | A | 8/1999 | O'Leary et al. |
| 5,960,200 | A | 9/1999 | Eager et al. |
| 5,987,423 | A | 11/1999 | Arnold et al. |
| 6,018,338 | A | 1/2000 | Greulich et al. |
| 6,067,525 | A | 5/2000 | Johnson et al. |
| 6,076,091 | A | 6/2000 | Fohn et al. |
| 6,089,765 | A | 7/2000 | Mori |
| 6,133,985 | A | 10/2000 | Garfinkle et al. |
| 6,138,139 | A | 10/2000 | Beck et al. |
| 6,167,382 | A | 12/2000 | Sparks et al. |
| 6,224,048 | B1 | 5/2001 | Motamed |
| 6,226,788 | B1 | 5/2001 | Schoening et al. |
| 6,320,671 | B1 | 11/2001 | Kelley et al. |
| 6,323,853 | B1 | 11/2001 | Hedloy |
| 6,330,542 | B1 | 12/2001 | Sevcik et al. |
| 6,332,146 | B1 | 12/2001 | Jebens et al. |
| 6,345,288 | B1 | 2/2002 | Reed et al. |
| 6,351,317 | B1 | 2/2002 | Sasaki et al. |
| 6,411,314 | B1 | 6/2002 | Hansen et al. |
| 6,415,277 | B1 * | 7/2002 | Klatt et al. .................... 707/1 |
| 6,429,947 | B1 | 8/2002 | Laverty et al. |
| 6,466,326 | B1 | 10/2002 | Shima |
| 6,473,760 | B1 | 10/2002 | Klatt et al. |
| 6,529,214 | B1 | 3/2003 | Chase et al. |
| 6,559,964 | B1 | 5/2003 | Tsukamoto et al. |

OTHER PUBLICATIONS

"Microsoft Press Computer Dictionary", Microsoft Press, Third Edition, 1997, pp. 248 & 278.
http://web.archive.org/web/200008154402/www.forbes.com/reprints/.
http/www12.rprint.com/cgi-shi/page_gen...e3183-3&raw=pressurereleases%sFpressreleases.

* cited by examiner

SYSTEM AND METHOD OF USING HUMAN RESOURCES DATA TO GENERATE PRINTED PRODUCTS

CROSS-REFERENCE TO RELATED APPLICATION

This application is related in subject matter to co-pending U.S. application Ser. No. 09/460,307, entitled "System and File Structure for Consistent Visual Medium Materials," which was filed on Dec. 13, 1999. That application is incorporated by reference herein.

TECHNICAL FIELD

This invention generally relates to systems that generate printed products, such as general office stationery (e.g., letterhead, business cards, or envelopes); and high-end marketing communication materials and other products that use digital printing, commercial offset printing, or flexography. More particularly, the invention provides various systems and techniques for using event-driven rules to initiate print-production tasks on the basis of data extracted from corporate systems or databases such as enterprise resource planning systems, human resource management systems, manufacturing, logistics, or other corporate systems.

BACKGROUND OF THE INVENTION

Conventional techniques for generating customized printed products such as business cards, stationery, and other personalized and marketing communication materials frequently employ computers in the production process. In FIG. 1, for example, a customer 103 desiring to have business cards printed for a new employee typically brings or faxes information 104 to a print broker 101, such as a local print shop or copy store. An employee 106 creates an order for the print product using an ordering computer 105. The print order may specify the number of cards to be produced, the font styles to be used, and customized content such as the employee's name, title, and telephone number.

The print order created in ordering computer 105 can be transmitted to a second facility 102 for preprocessing. The order can be transmitted as an ASCII file over a communication link 107 to a second computer 108 at the second facility. A layout computer 108, operated by another employee 109, is used to lay-out the content within the space and style constraints of the printed medium (e.g., business cards of a certain size). Conventional software packages such as Pagemaker™ and Quark™ can be used to format the printed product and simulate its appearance before it is actually printed.

The output of the layout computer, which may comprise for example a PostScript™ file, is sent to an image setter 110, which is a device that generates a plate or other medium that can be directly used by a printing press 111 to produce the printed product 112. Depending on the type of print medium, the printed product may comprise customized paper products, embossed materials, rubber stamps, plaques, or the like. Although the conventional arrangement shown in FIG. 1 is exemplary, the system may be housed in a single facility, such that all of the printing tasks occur at a common location.

Large corporations by their nature require large quantities of customized printed products, such as business cards, sales brochures, and letterhead. Each time a new employee joins a corporation or a new brochure is needed, the steps shown in FIG. 1 must be carried out. Repeating these steps incurs extensive costs due to human involvement (e.g., labor costs) and the possibility that errors may be introduced into one or more steps. Because of the many steps and human involvement, a simple printing job can take days or even weeks.

As one example, an employee's name must be typed or printed on an order form, then transferred into an ordering computer, and manually entered again into a layout computer. Every time a human touches the information, the process is delayed and the possibility exists that an error will be introduced. Additionally, various validation and approval procedures must be followed in order to ensure that the printed information will be produced correctly, and that only certain authorized products are printed.

Attempts to further automate the foregoing processes are complicated by the fact that different print brokers may use different formats, techniques, and software products for entering data and generating printed products, and the fact that different companies store content such as employee names and addresses in different ways. Other automation barriers are inherent in the distributed and non-uniform process steps that are carried out by different print vendors and suppliers. Some of these problems are discussed in more detail in co-pending U.S. application Ser. No. 09/460,307, filed on Dec. 13, 1999, and incorporated by reference herein.

One approach for solving some of the foregoing problems is to use a centralized print production system that accepts print orders over the Internet and allows the customer to approve print proofs on-screen. As described in the above-referenced patent application, the printing process can be simplified by using certain file formats and data processing techniques to generate printed products. Nevertheless, further automation is possible.

Enterprise resource planning systems (ERPs) are conventionally used to store, track and plan information concerning an enterprise, such as a company. For example, many companies use human resource management systems that store information such as employee names, addresses, titles, salaries, and the like. An example of one such system is a commercially available product from PeopleSoft.™ Such systems typically perform payroll and accounting functions, and other human resource related functions such as organizational management. Other enterprise resource planning systems perform tasks such as tracking and planning sales, manufacturing operations, and the like. Companies that do not use ERPs may nevertheless store company-wide information in databases that allow the data to be accessed in a structured way.

The aforementioned ERPs and databases have not typically been coupled to an automated printing facility of the type described above. Even though ERPs and related databases store extensive company-wide information such as employee data, organizational information, inventory and manufacturing data, and the like, such ERPs and databases have not been linked to an automated print production process that could make direct use of the data stored therein. Instead, humans still manually generate print production requests on the basis of changes to the company's data. Because corporate databases and ERPs have historically not been directly accessible to outside vendors, it has not been feasible to directly translate data stored in such databases into print production requests.

When a new employee is added to a company's database, a human resources manager must recognize that event, and must manually create a print order for new business cards, name plaques, and letterhead. This manual intervention provides opportunities for errors to creep into the print production process, and introduces delays. (For example, if the human resources manager is out sick, busy, or on vacation, the order for business cards may be delayed). Moreover, the labor involved in generating such print orders is costly, particularly where a company adds dozens of new employees on a weekly or monthly basis.

As another example, suppose that a corporation decides to create award plaques, coffee mugs, and specially embossed pins for all sales employees who have exceeded a sales quota. The job of creating print orders to generate such printed products would typically fall to a human resources manager or similar employee, who would query the company's database to identify such sales employees, generate a printout of employee information (e.g., name, title, and the like), and manually create print orders for the various printed products. That task is labor intensive and, as noted above, could result in misspelled names or other data errors.

As yet another example, suppose that a bicycle manufacturing company receives an order to manufacture 5,000 new bicycles of a particular model and style. A manager at the manufacturing company must determine when the bicycle order will be completed and, based on the schedule, create a print order to have printed instruction manuals, warranty cards, and the like generated in time to be included with the manufactured bicycles and shipping boxes.

SUMMARY OF THE INVENTION

The present invention provides a system and method for extracting information from one or more corporate databases and automatically generating print production orders using such information. In one embodiment, a set of event definitions is provided based on changes to data in the corporate database. A set of event rules is also defined, such that a print production request or requisition is automatically generated in response to firing of one or more event rules. The print production request or requisition contains data directly extracted from the corporate database, rather than being manually entered by an employee. A notification can be generated that confirms that the print order was automatically generated and indicates a date by which the print order will be processed and shipped.

According to other aspects of the invention, a computer program monitors changes to one or more corporate databases and generates event data in response to such changes. The event data is transmitted over the Internet to a centralized print production facility, where the event data is used to fire one or more event rules, which in turn automatically generate print requisitions or print production orders. In one variation, print requisitions are routed through an existing and commercially available procurement system, such as Ariba™, before a print production order is generated. One variation of the invention can monitor and handle event data from multiple corporations, each having its own business-related event rules, and each potentially having its own procurement approval system.

Fields in print requisitions and orders can be mapped to corporate database schemas, such that different corporate identifiers for a particular data item (e.g., employee name) are mapped to a common data item in the print production facility. Moreover, some or all of a corporate database can be mirrored at a central facility so that information for print requests can be extracted locally rather than generating further queries in the corporate database.

The inventive principles have broad application to various types of corporate databases and ERPs. In a human resources management system, print orders for new business cards can be automatically generated whenever a new employee is added or when an organizational change occurs. In a manufacturing environment, print orders can be automatically generated when a new design is released for production or when an order is placed that requires corresponding printed products. In a sales management system, customized sales brochures can be automatically printed in response to entry of a new sales prospect. In an inventory control system, print orders can be automatically generated when inventory levels fall below a threshold, or after a specified period of time has elapsed (e.g., print new brochures every 90 days). In a publishing environment, reprint orders for magazine articles and the like can be automatically generated in response to a reprint order request, or when the number of reprints in stock falls below a certain level. Other application areas are also possible.

DETAILED DESCRIPTION OF THE INVENTION

Figure 1:
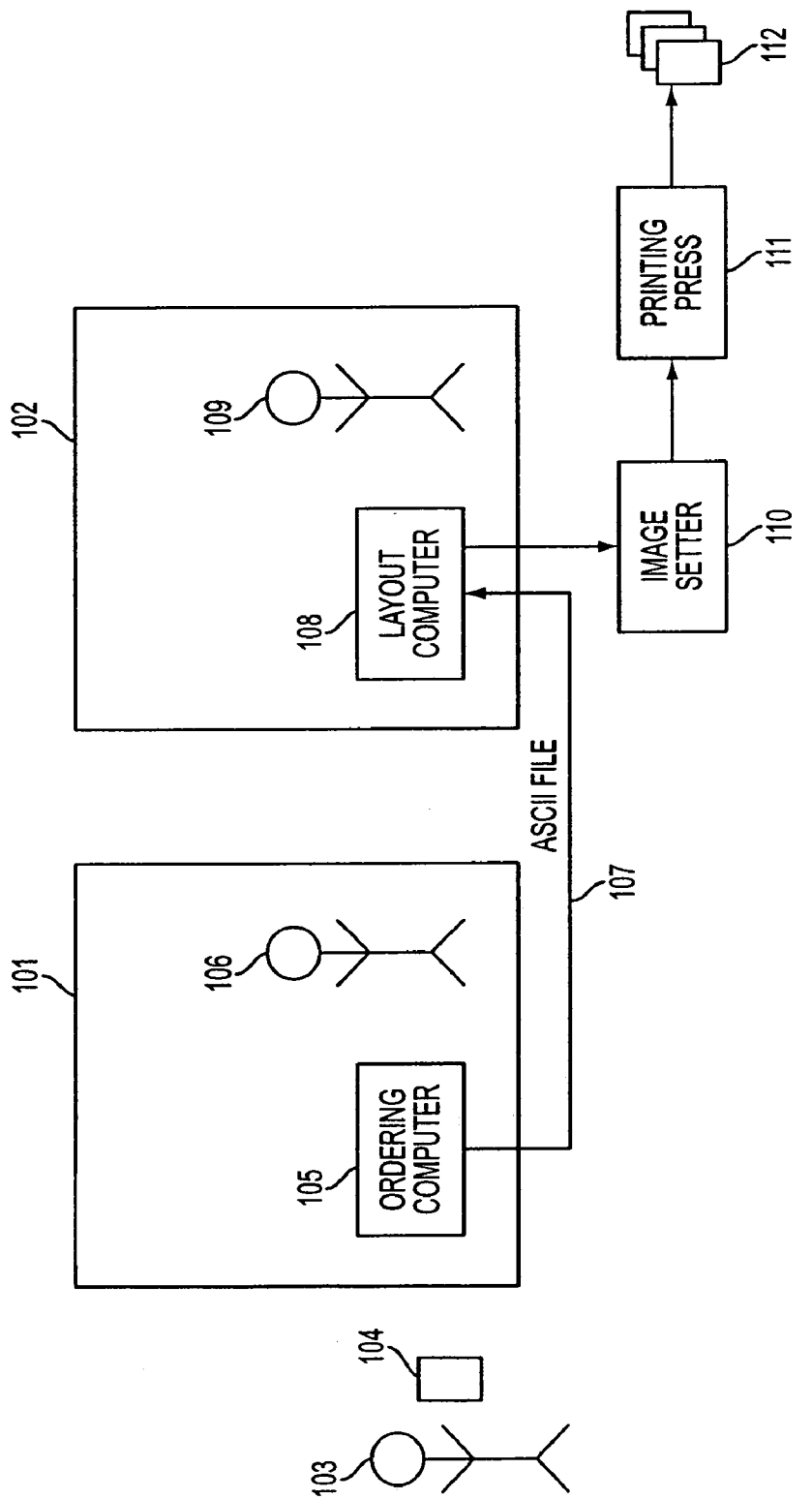
FIG. 1 shows a conventional technique for generating a printed product such as business cards.
Figure 2:
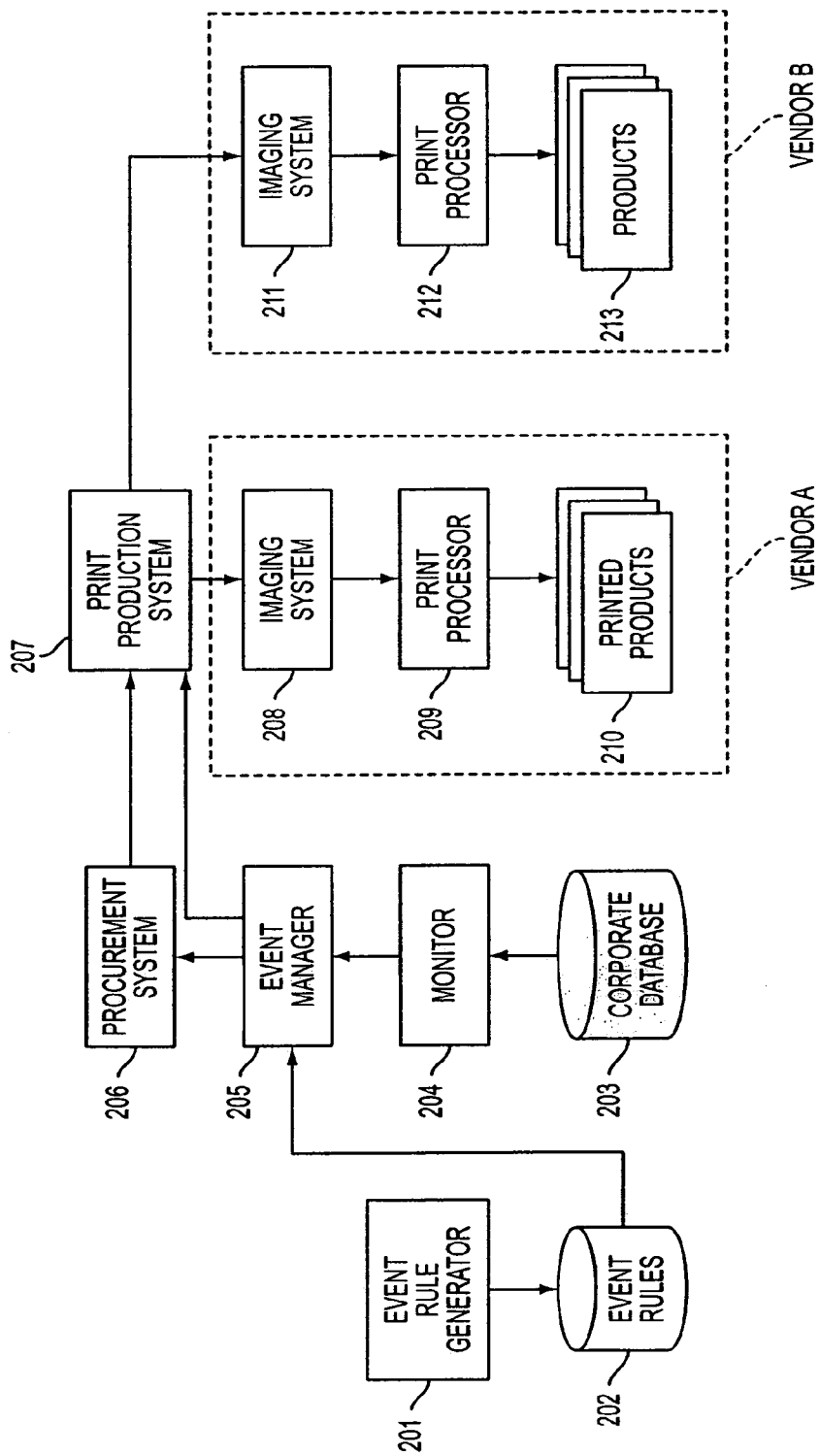
FIG. 2 shows a system that monitors changes to a corporate database and executes rules that automatically generate printed products in response to such changes.

FIG. 2 shows a system that employs various principles of the present invention. As shown in FIG. 2, an event rule generator 201 is used to generate one or more event rules that are then stored into an event rules database 202. The term "event rule" will be used to refer to a rule that generates an action in response to a business-related event, such as the addition of a new employee to a corporation; a change in inventory levels for a product; or the receipt of an order to manufacture a product. Other rules based on parameters such as the passage of time could of course be defined. Although it is expected that different companies will have different event rules tailored for their particular business needs, it is of course possible to use the same set of rules for more than one company.

According to the invention, event rules can be defined using any of various techniques such as a graphical user interface or a natural language tool. At least some of the rules may specify that one or more print production requests or requisitions is to be generated upon occurrence of a business event. An example of an event rule might be: IF (new-employee-added) THEN GENERATE (REQUISITION: business-cards USING new-employee-information). The nature and number of the rules will of course be dependent upon the type of business, the type of database, and the type of ERP used by the company. In general, however, it is expected that event rules cause, either alone or in combination with other rules, one or more print production requests to be generated using information pertaining to the event.

The term "print requisition" will be used to refer to a print request for which further approval or information is required before the printing can be completed. The term "print production request" will be used to refer to a print request that can be executed without such intermediate approval or additional information. Print requisitions and print production requests may be referred generally herein as a "print order."

The term "event" will be generally used to refer to a real-life event that can be detected (e.g., adding a new employee, or a change to an inventory level), while the term "event data" will be generally used to refer to information concerning an event that has occurred (e.g., the employee's name and other information). The term "event message" will be generally used to refer to event data that has been augmented with some additional information in order to generate a print requisition or print production request. These terms are not intended, however, to be limiting. Moreover, the invention can be practiced without using event messages altogether.

Some event rules may not directly result in the generation of a print requisition or a print production request, but may instead set variables or store data into a database that causes other rules to fire. For example, a first rule could be defined that increments a new employee counter whenever a new employee is added, and a second rule could be defined that generates a new order for business cards whenever the number of new employees reaches five.

Moreover, some events may cause other events to fire. For example, if an organizational unit of a company changes its name, then all employees belonging to that organizational unit may require new business cards. A rule can be constructed that automatically queries all employees in the new organizational unit and generates print requisitions for new business cards (using the new organizational name) for all such employees.

The general creation and use of rules to perform further processing is conventional and can be implemented using well-known expert system techniques (e.g., PROLOG), for example. Customized rules could also be programmed directly in software using programming languages such as C, C++, Visual Basic, LISP, or the like. See U.S. Pat. No. 5,893,911, entitled "Method for Defining and Applying Rules for Message Distribution for Transaction Processing in a Distributed Application," assigned to Neon Software Inc. Examples of various user interfaces that could be used for establishing business related event rules are provided herein.

Returning to FIG. 2, it is assumed that a corporate database or ERP 203 contains information relating to a particular application area, such as human resources, inventory control, sales management, or the like. The database can comprise a relational or object-oriented database, and data residing in the database can be queried and modified using well-known data access conventions such as Structured Query Language (SQL). Any of various commercially available databases such as Oracle, Sybase, or Informix could be used. It is of course possible that multiple databases co-exist on a single computer, or one or more databases can be distributed across different computers in a corporation.

A computer-implemented monitoring function 204 monitors corporate database 203 for changes. Monitoring function 204 can be configured to watch for changes to particular fields or tables in a corporate database (e.g., any change to employee records), or it can be configured to generate event data whenever any change occurs. When a new record is added to the database, monitor 204 extracts some or all of the new information ("event data") and transmits it to event manager function 205. For example, if a new employee is added to the database, monitor 204 extracts the new employee's name, address, and other information, and transmits the event data event manager 205. Monitoring function 204 can be configured to periodically query the database for new records, or it can be configured to intercept database updates and generate event data in response thereto. Moreover, the monitoring function can be implemented on a separate computer coupled to a computer on which the corporate database resides, or it can by hosted on the same computer as the database.

In some cases, subsidiary information may be required in order to create a print requisition or print production request, and other databases can be queried to create information sufficient to create a print requisition or print production request. For example, when a new employee is added to the database, the billing and shipping information for business cards to be printed for the new employee can be extracted from a different database. As another example, a particular company's graphics logo that is used on business cards may not reside in the corporate database 203, but may instead be stored in a different location. The subsidiary look-up functions could be performed by monitor 204, by event manager 205 or by another software function. Such further information may exist on a corporate database or it may exist locally on a central print production server.

Event manager 205 receives event data from monitor 204 and, by executing rules stored in event rules database 202, generates a print requisition to a procurement system 206. In one embodiment, procurement system 206 comprises a commercially available procurement product such as Ariba™, Concur™, or Commerce One™. Such systems provide facilities for creating and updating purchase orders and obtaining approvals to release the orders to vendors. In other embodiments, a print production request is directly generated and provided to print production system 207 without going through a procurement system 206.

One possible print production system 207 is described in co-pending application Ser. No. 09/460,307, entitled "System and File Structure for Consistent Visual Medium Materials," which is incorporated by reference herein. Print production system 207 may comprise a centrally located facility through which print orders can be received over the Internet from a plurality of companies. Imaging system 208 and print processor 209 are conventional. Imaging system 208 may comprise any of various types of devices that generate print media such as printing plates or sheets on the basis of an electronic file, and print processor 209 performs the actual printing, embossing, engraving or the like in order to generate printed products 210.

In one embodiment, print production system 207 can transmit print orders to multiple vendors, such as Vendor A and Vendor B shown in FIG. 2. In this manner, different rules can specify that certain types of print production tasks are to be routed to one geographic print location, while other types of print production tasks are to be routed to another geographic print location. For example, if business cards are to be printed for a new employee at the California location of a company, the actual print job can be routed to a print vendor located in California, in order to minimize shipping costs and expedite delivery. A print job for an employee located in New Jersey might be routed to a New York City vendor for the same purpose. In one embodiment, a software function in print production facility 207 locates the print vendor nearest to the shipping location. The print production system can be coupled to different vendors over the Internet, by facsimile, or by other methods.

Rules can be created to select vendors based upon other criteria, such as ownership of the vendor or the business practices of the vendor. For example, some municipalities require that, in order to enter into a contract with the municipality, an organization subcontract a percentage of services to minority-owned businesses. Alternately, some organizations desire to only employ services from environmentally friendly companies. Accordingly, rules can be used to select vendors based upon ownership of the vendor or the vendor's business practices.

Figure 7:
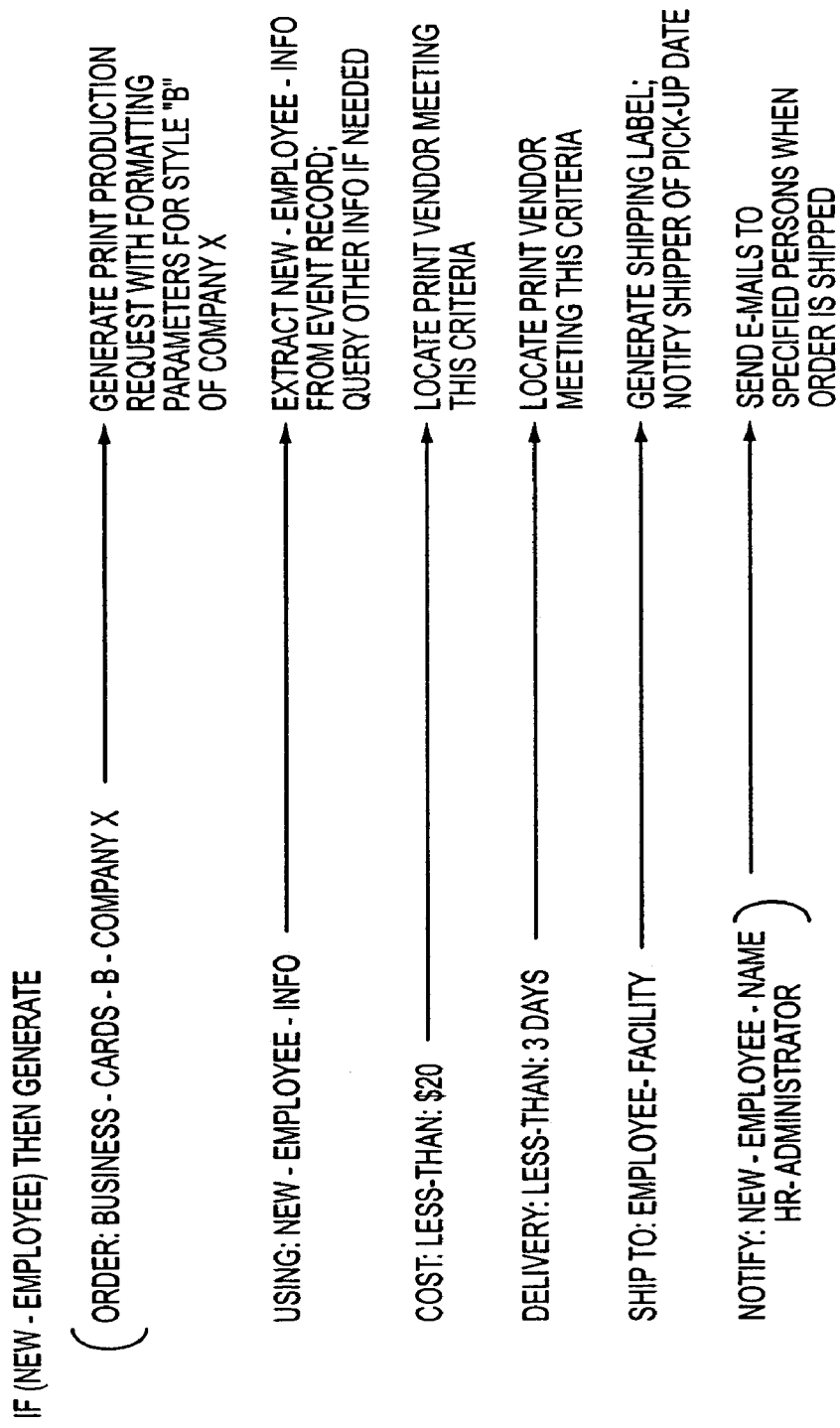
FIG. 7 shows one possible event rule that can be used to specify various parameters such as style, cost, delivery options, shipping destination, and notifications.

More generally, rules can be used to specify various cost, schedule, delivery, location, print quality, shipping, and other parameters associated with print jobs. Turning briefly to FIG. 7, a rule can be defined that is fired whenever a new employee is added to Company X's corporate database. The rule can specify that upon such an event, a print production request for new business cards be generated using a particular pre-defined business card style for Company X. The rule can also specify that the business card be generated using information regarding the new employee extracted from the event data (i.e., extracted from the corporate database), wherein additional information such as billing information can be extracted from other data sources. Moreover, the creator of the rule can specify that the cost must be less than $20 for a set of business cards, thus causing print production system 207 to locate a print vendor that can satisfy this requirement. Alternatively, rules can be used to optimize multiple print production requests into a print job that can be routed to a vendor able to satisfy the requirement.

The rule can also specify a delivery constraint (e.g., must be delivered within 3 days), which can be used by the software to locate a print vendor that is within a 3-day shipping area of the shipping address (or is willing to ship on an expedited basis within that constraint). A shipping address can also be specified, and if necessary can be queried from the corporate database or other location. Finally, a notification option can be specified in order to notify the employee and the human resources administrator when the order is shipped. Other variations are of course possible, and the example of FIG. 7 is not intended to be limiting.

Figure 3:
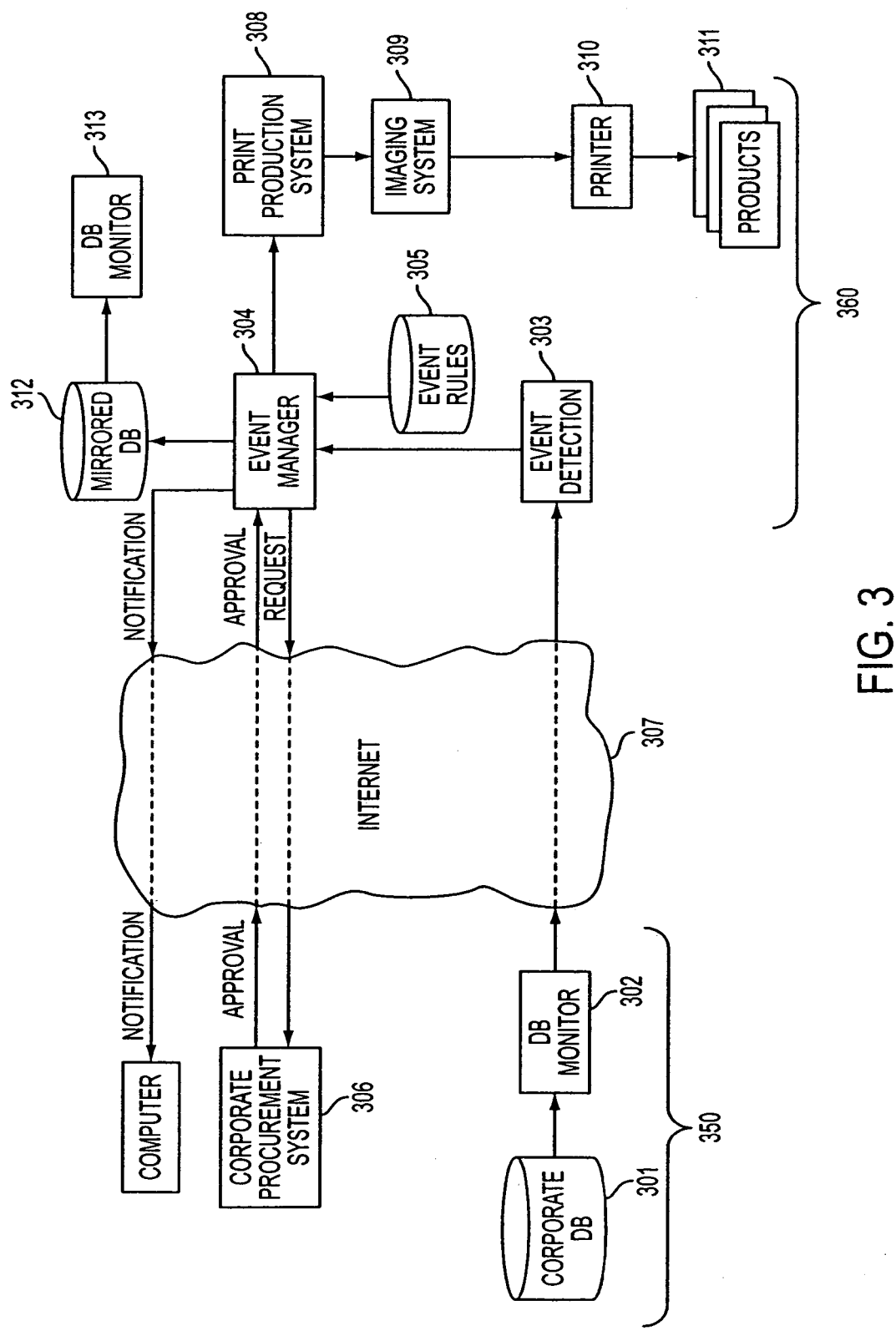
FIG. 3 shows a print production system that uses the Internet to communicate event data and obtain procurement approvals.

Turning now to FIG. 3, a system that incorporates various principles of the invention in an Internet environment (or similar network) will be described. It is assumed that a corporate database 301, a database monitoring function 302, and a corporate procurement system 306 is located at a company facility 350. Additionally, it is assumed that monitoring function 302 and corporate procurement system 306 are accessible through the Internet 307 using conventional protocols such as HTTP, FTP, and the like. Event manager 304, event detection function 303, event rules database 305, and mirrored database 312, along with the other functions on the right side of FIG. 3, are assumed to reside at a centrally located print production facility 360 that is similarly accessible over the Internet 307. It will be appreciated that certain of the functions can be centrally located, while others (e.g., imaging system 309 and/or print processor 310) could be located at a separate facility.

Database monitoring function 302 comprises software that is tailored to the company's corporate database 301 to monitor changes to certain fields in corporate database 301 and, in response thereto, generate event data that is transmitted over the Internet or other network to event detection function 303 at the central print production facility 360. Database monitoring function 302 may be implemented on a separate computer from corporate database 301, or it may co-exist on the same computer. According to one embodiment, database monitoring function 302 and event detection function 303 use the commercially available WebMethods Server software in order to extract and transmit information over the Internet. It will be appreciated that instead of the Internet, other types of networks such as local area networks and the like can be used.

Event detection function 303 receives event data from monitoring function 302, converts each into an event message that forms the predicate for one or more rules in event rules database 305, and passes the event message to event manager 304. Where necessary, database fields in corporate database 301 are mapped to fields used internally by print production facility 360 to create printed products, and this mapping can be done in monitoring function 302, event detection function 303, or event manager 304. As explained above, conversion of event data into an event message structure may require supplementation of data such as billing information and the like, although such a step may not be required. Database monitor 302 and event detector 303 can be located on either client side 350 or print facility side 360, depending on design requirements.

Figure 6:
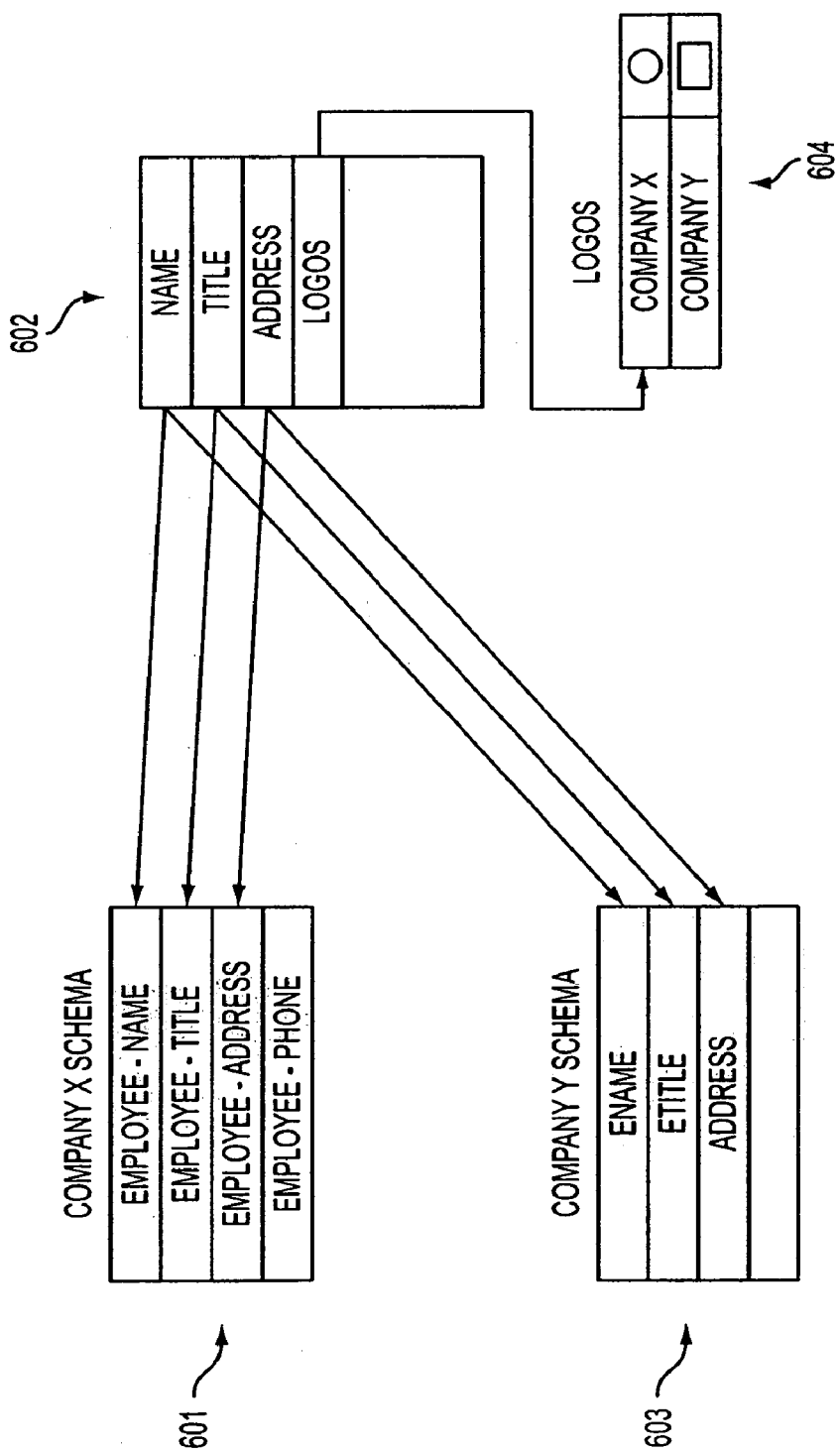
FIG. 6 shows how fields in different corporate databases can be mapped to a common data element in a central print facility, and how certain fields can be mapped to locally stored data that is not stored in the corporate database.

Turning briefly to FIG. 6, a first company (Company X) might use a certain database schema that contains fields identified as EMPLOYEE-NAME, EMPLOYEE-TITLE, and the like. A second company (Company Y) may refer to similar data items in its database as ENAME, ETITLE, and so forth. Fields in different corporate schemas 601 and 603 can be mapped to a common schema 602 within print production facility 360, such that an instance of a field for EMPLOYEE-NAME from Company X is stored into a generic NAME field in the print production facility, and an instance of a field for ENAME from Company Y is stored into the same named field in the print production facility. Similarly, data that does not reside in either company's database can be stored locally within print production facility 360 in a separate database 604 having fields mapped to the common schema 602. For example, a "logo" field that refers to a graphical logo that is to be printed on a company's business cards may be stored separately in a logo database 604 at the print production facility. References to each company's logo as part of a print order will cause the logo to be retrieved locally from database 604.

Returning to FIG. 3, in one embodiment event manager 304 executes event rules and, in response thereto, generates a print production request to print production system 308. In another embodiment, event manager 304 executes a rule that causes a print requisition in the form of a procurement order to be generated and sent to corporate procurement system 306 for approval. Such a request can be sent over the Internet, and approval returned in the same manner. After receiving approval, a print production request is generated and passed to print production system 308 for execution. Event manager 304 can also automatically notify a corporate employee (e.g., via e-mail) to confirm that the order was placed. The latter notification can include an estimated completion and shipment date for the order.

Event manager 304 can be implemented as a queue-driven process that retrieves a next event from the queue; retrieves any business rules that apply to that event, and performs the actions that apply to that event. Different sets of event rules for different companies can be stored in event rules database 305 and retrieved according to the company from which an event was generated. Moreover, event manager 304 may generate additional events based on the firing of certain rules. For example, if an organizational change occurs, a rule can be fired that automatically queries all employees affected by the organizational change and generates a print requisition for each new employee to create new business cards for those employees. In certain embodiments, it may also be possible to pass event data directly to event manager 304 without processing by event detection function 303.

In one embodiment, a mirrored database 312 is maintained at the central print production facility 360, such that database changes in corporate database 301 are transmitted to mirrored database 312. When additional information is needed for a print request, it can be extracted directly from mirrored database 312 instead of querying corporate database 301. In yet another variation, monitoring function 313 can be located at the print production facility and used to monitor changes to mirrored database 312 instead of hosting such monitoring functions at the corporate facility. In this case, some mechanism for maintaining synchronization between the databases would be needed (e.g., periodic batch updates or the like), as is known in the art.

Certain types of print requisitions may require additional information, such as a billing or shipping address for the print production request. This additional information can be extracted from corporate database 301, from mirrored database 312, from a local database maintained at the print production facility 360, or provided by corporate procurement system 306.

In one embodiment, print requests are generated when an external procurement request is generated. According to this embodiment, a company employee uses a commercially available procurement system to request a print job (e.g., new business cards). The procurement system recognizes the request as one to be directed to a print vendor, and transmits the request to event manager 304 over the Internet. Event manager 304 fills in customer-specific details not included in the request, verifies the completeness and correctness of the resulting structure, and places the request in a queue for processing.

According to one variation of the invention, event queues may be used to temporarily hold event messages until another specified event occurs (for example, the passage of a period of time). Queues can be used on the client or corporate side 350 of the system of FIG. 3 (e.g., in connection with database monitor 302), or they may be placed on the print production facility side 360 of FIG. 3. For example, event messages can be queued until the end of a business day, or until a specified number of events (e.g., ten or more events) have occurred. Additionally, events can be conditioned on the occurrence of other events.

It will be appreciated that the various functions illustrated in FIG. 3 can be located on the client side (350) instead of at a central print production facility (360), and that various functions may be combined for purposes of design and efficiency. Consequently, the architecture shown in FIG. 3 is intended to be exemplary only. For example, at a portion of the event detection function may be combined with the database monitor 302 on the client side 350. This allocation of function would help reduce the number of actions to be handled by event detection function 303 and event manager 304. In this instance, the database monitor 302 could store event rules and include a queue that stores database actions until an event is to be generated.

Figure 4:
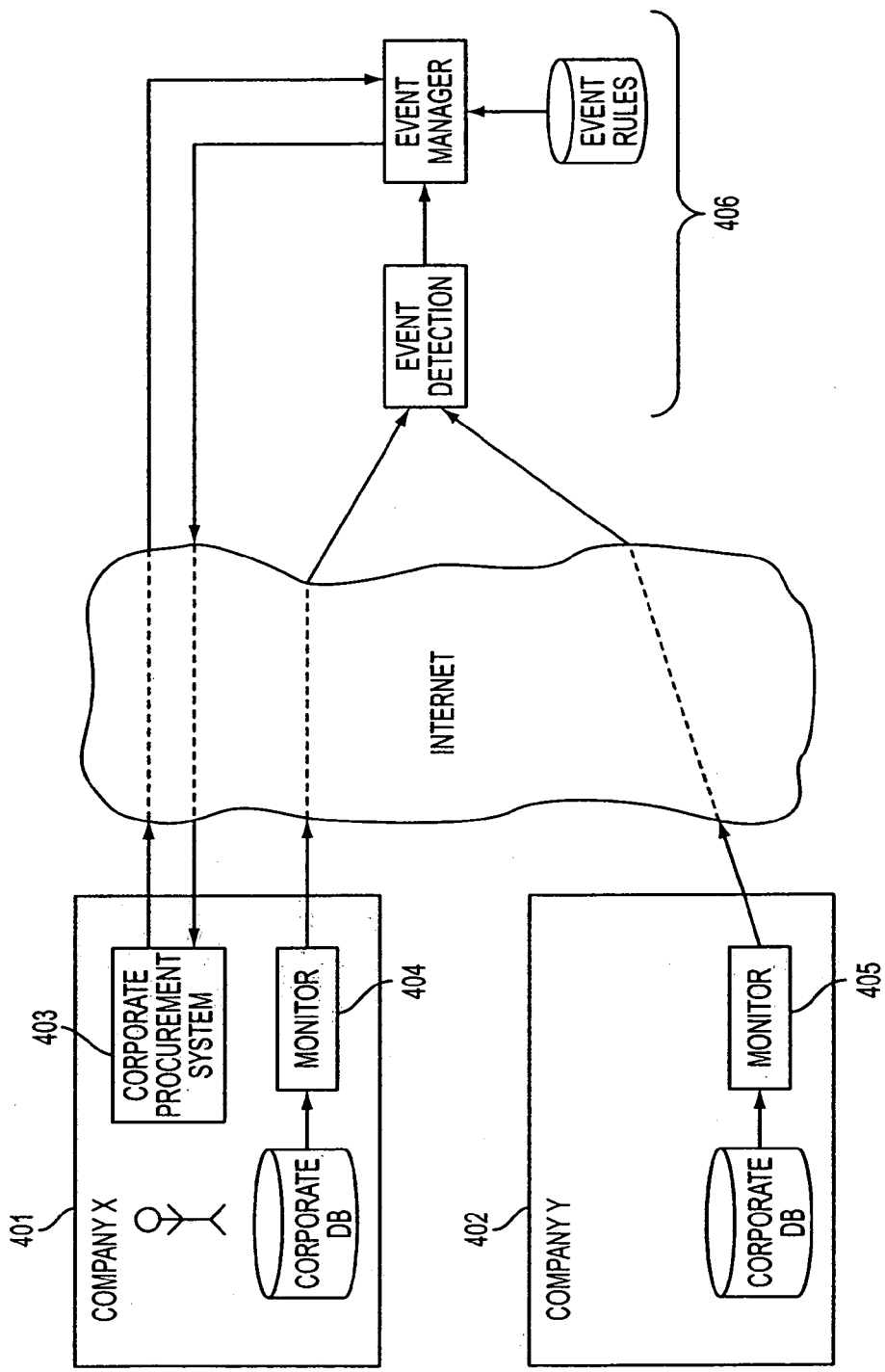
FIG. 4 shows a centralized print production system that detects events occurring at a plurality of companies, wherein one company uses a corporate procurement system through which print requisitions must be handled while another company does not use such a procurement system.

FIG. 4 shows an alternate embodiment in which a plurality of companies 401 and 402 are coupled to a print production facility 406 through the Internet, and wherein a first company 401 uses a corporate procurement system 403 for approval of print requisitions, while a second company 402 does not use such a procurement system. This embodiment illustrates how a central print production facility 406 can handle different types of requirements from different companies.

Figure 5:
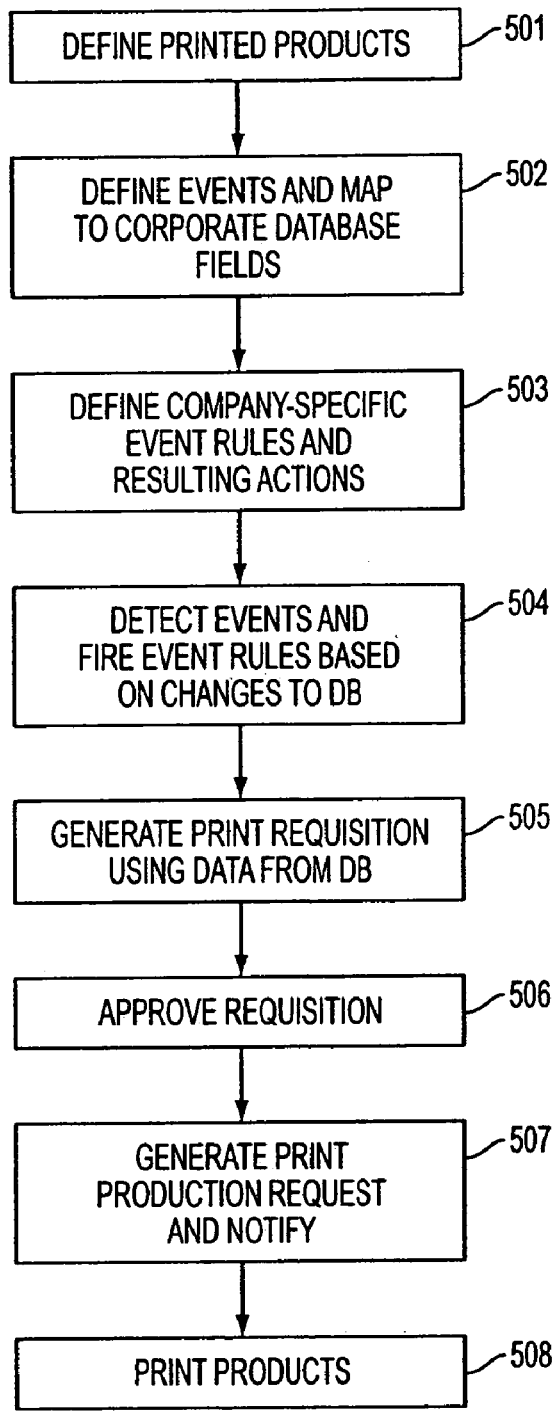
FIG. 5 shows a series of steps that can be carried out to implement a method in accordance with various aspects of the invention.

FIG. 5 shows steps that can be carried out to implement various methods of the invention. Beginning in step 501, one or more printed products are defined, and the data content required for each product is mapped to one or more fields at the print production facility. For example, a business card product may comprise various common fields such as name, title, address, telephone number, corporate logo, and the like. Additionally, certain formatting information such as the size, shape, color, and other parameters of the business card are specified. This information collectively defines one type of printed product (e.g., business card type A). Step 501 may be performed with respect to a user interface as shown, for example, in FIG. 15.

In step 502, events that can occur in the system are defined and mapped to one or more corporate database fields. For example, an event message NEW-EMPLOYEE-ADDED can be defined to occur when a new employee record is added to the corporate database, and various fields from that record are mapped to corresponding fields in the print production facility (see FIG. 6). Some rules can be created such that they are triggered automatically upon passage of a certain quantity of time (e.g., check an inventory level every days, or print a new catalog once a year based on the current state of a parts database).

In step 503, company-specific event rules and corresponding actions are defined. As one example, when a new employee record is added to the corporate database, a print requisition for 1,000 business cards, a new name plaque, and customized letterhead for that employee will be automatically generated, using data extracted from the corporate database (i.e., without human input). If the employee is a sales employee, then sales brochures or other pertinent printed products can be generated.

As a further example, a company may have a specific business rule that states that if a sales person exceeds his or her sales quota for a given quarter, that salesperson may order a special set of business cards and stationery items. In this example, events can be defined (step 502) such that once an individual sales quota is exceeded, two actions will be performed by step 504. One action may be to grant ordering privileges to the special product set, and the second action may be to send a notification to the salesperson informing them of their ability to order these products. This example does not exclude the possibility that a print production request could be generated directly (step 507).

As another example, if a new product order is added to the database, a print requisition for a number of printed products (instruction books, warranty cards, and the like) corresponding to the number of products ordered will be automatically generated. Again, it is preferred that no human manually enter information such as numbers or product codes in order to generate the print request, in order to minimize human intervention and avoid data entry errors.

Step 503 may also include interacting with a user interface. The user interface may take the form of displays on a screen similar to those shown in FIGS. 9, 11, 12, 13, and 14. After interacting with the user interface, the event rules may be saved into event rules database 202.

Rules can be defined to perform any of various actions when triggered by an event. Some examples include:

(1) Send an e-mail regarding notification or scheduling of a future event;

(2) Create, cancel, or approve a purchase order; or update a database record in a central print production facility (including checkpointing or taking a snapshot of a corporate database);

(3) Perform an external procurement operation (e.g., through a commercial system)

(4) Perform an action on an external customer corporate data (e.g., update an employee record, update an inventory record, or insert a purchase order number);

(5) Perform an action on a print vendor's system (e.g., add job, cancel job, etc.);

(6) Perform an action on an external manufacturing tracking system, such as HAGAN™ (e.g., create a job in process, update job in process, etc.).

An automatic procurement action can be initiated based on detection of an event. For example, if a new employee is added to the corporate database, a procurement order can be automatically generated to request that a certain predetermined set of personalized office supplies such as letterhead, envelopes, business cards, and the like be ordered and shipped to the new employee's address.

In step 504, events in the system are detected and rules fired based on changes to the corporate database. Alternatively, event messages may be generated in response to a manually entered procurement order.

In step 505, a print requisition is optionally generated using data extracted from the corporate database and, if necessary, from other sources (e.g., logo image files; billing and shipping addresses). As explained above, requisitions could be avoided and print production requests directly generated in certain embodiments of the invention. If a print requisition is generated, then in step 506 approval of the requisition occurs, either through a commercially available procurement system or some other mechanism.

In step 507, a print production request is generated, again preferably using information extracted from the corporate database rather than manually entered information. Additionally, a notification feature can be provided, such that an e-mail message is transmitted to a predetermined employee (or to the employee whose print products were automatically ordered) confirming that the print order was submitted, and providing an estimated completion and/or shipping date.

In one embodiment, a notification or shipment request can also be generated for a vendor to schedule further action on a particular date. For example, if it is determined that the print job will be completed in two days and result in a certain quantity of paper products, an advance notification can be transmitted to a shipping vendor to schedule pick-up of a predetermined number of boxes on the date that the print job will be completed.

Finally, in step 508 the printed products are generated. These may comprise paper products, plaques, embossed items, packages, container labels, and the like.

Figure 8:
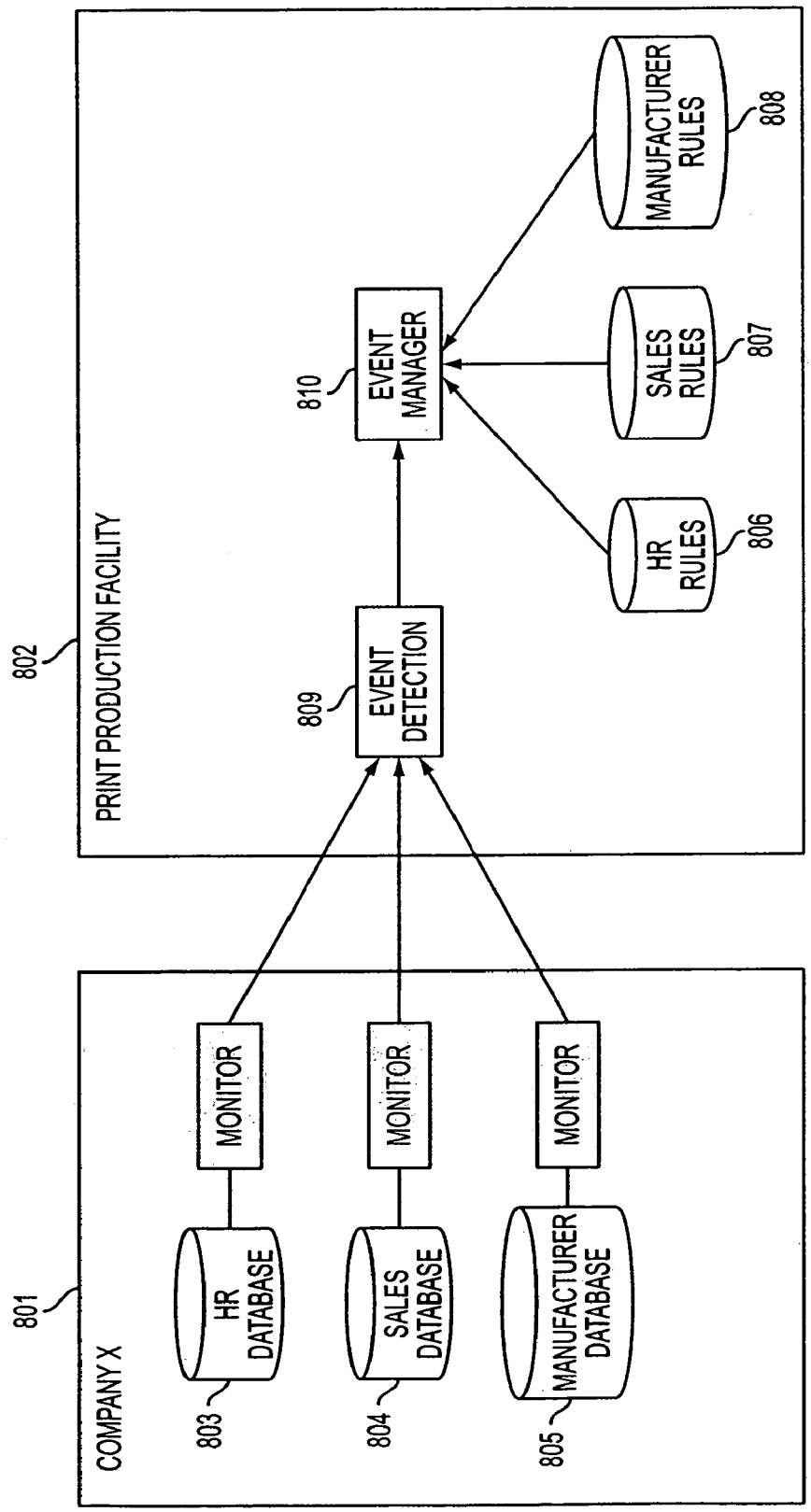
FIG. 8 shows a system in which a plurality of corporate databases within a single company are monitored for changes, and a plurality of event rules are defined to handle event data from each database.

FIG. 8 shows a system in which a plurality of different types of corporate databases, such as human resources database 803, sales database 804, and manufacturing database 805, are monitored in order to generate event data to an event detection function 809. Event detection function 809 generates event messages that are handled by event manager 810, which applies separate rules tailored for each type of database. For example, one set of human resource rules 806 may apply only to events occurring in the human resources database 803, while sales rules 807 pertain only to events arising from sales database 804 and manufacturing rules apply only to events occurring in manufacturing database 805. Although separate monitoring functions are shown in FIG. 8 to allow for the possibility that the databases may reside on different machines at different locations, the monitoring functions and databases could of course be combined into a single machine at one or more locations.

A more detailed description of one possible approach for allowing a user to define various types of event rules in the system will now be provided with reference to FIGS. 9 through 16. Various user interface techniques, such as form-driven web pages, can be used to accept user input to define event rules. As discussed above, rules can also be specified in a declarative language such as PROLOG or the like and executed by an inference engine. Combinations of the two are also possible, such that a browser-based form input tool is used to generate declarative rules, which are then interpreted by an expert system or inference engine.

Figure 9:
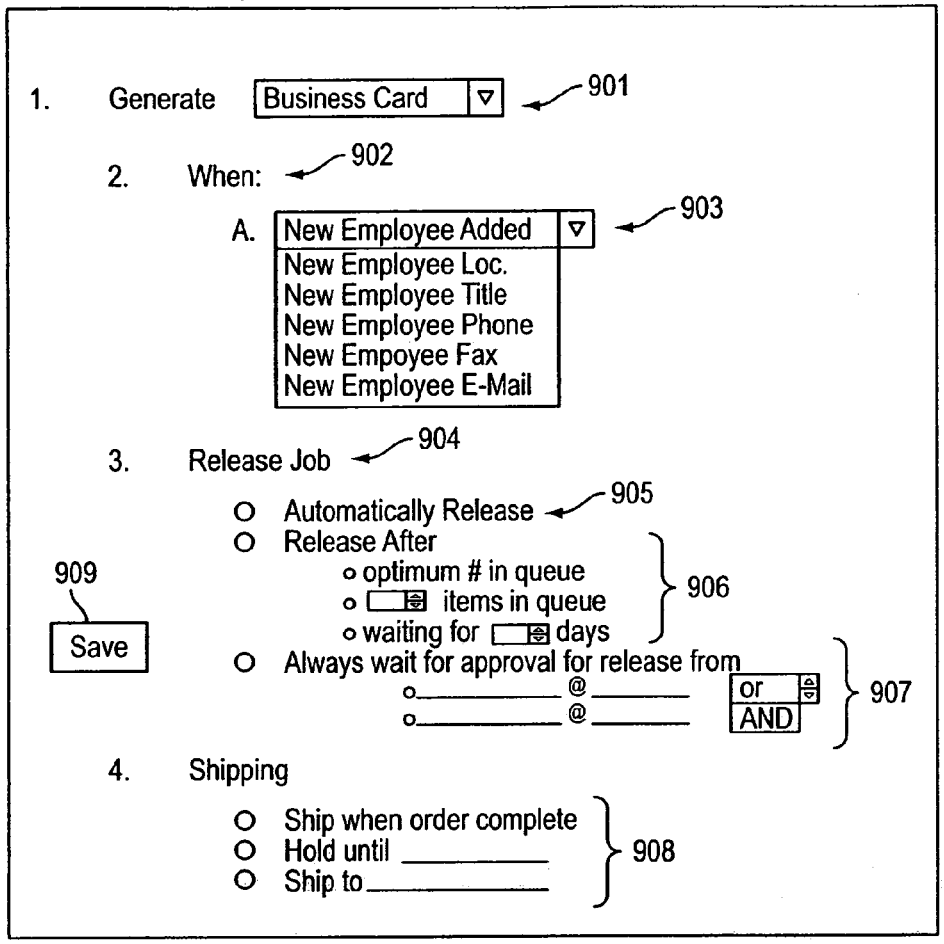
FIG. 9 shows a user interface for defining event rules relating to printing documents from information stored in a human resources database.

Referring to FIG. 9, a user interface is shown for receiving input relating to designation of event rules. The user interface includes a first selection 901 in which a user designates the type of printed product to be generated. A second selection 902 allows the user to designate when an action or event will trigger the rule, and includes a pull-down menu 903 that specifies various types of events that can occur in the database to which the rule pertains. According to one embodiment, the events correspond to changes to pre-defined columns in a database table (e.g., new employee, changed telephone number, and the like).

Option 904 allows the user to specify when the print production job should be released, and may include a variety of options 905, 906, and 907. For example, as indicated at 905, the print job can be released automatically, so that the printing is initiated immediately after detection of the event. Alternatively, the print job release may be conditioned on various factors such as whether an optimum number of print jobs has been received in a queue (optimum in the sense that multiple print jobs can be combined for efficiency); whether a certain number of print requests has been received; or whether a certain number of days has elapsed.

An optimum number of print jobs may relate to specific conditions of the printing production system 308 of FIG. 3. For example, as is known in the art, business cards are generally printed in batches consisting of groups of four, six, eight, etc. cards each. A printer attempts to minimize set up and break down costs for a printing press by placing as many different cards on each printing plate or die as possible. By increasing the number of cards on the plate or die, the longer the run length of the printing press. Because setting up and breaking down a press run involves certain fixed costs, overall costs can be minimized by spreading the fixed costs over as many printing jobs as possible. The ability for the client to specify that the rule is only to be fired when there are an optimum number of print jobs thus may reduce costs to the client.

Finally, user interface portion 906 allows for a default release after a selected number of days. If a queue resident on event manager 304 contains actions that are older than a specified number of days, the queue will be flushed and the event manager 304 will initiate the print production requests for items in the queue.

User interface selection 907 allows a user to designate that the job will need to be approved prior to releasing the job. In this situation, the user would enter the information regarding who will provide approval. In some cases, multiple approvals may be required. Where at least one person or process has been designated to approve a job, the occurrence of an action satisfying the criterion of 903 instructs event manger 304 to generate a request for approval from corporate procurement system 306. In an alternative embodiment, corporate database 301 can be updated with an indication that approval has been sought, thus causing database monitor 302 to monitor corporate database 301 for an indication that the print job has been approved. At that point, database monitor 302 would transmit an approval action to event detection 303, which would then generate an approval event for handling by event manager 304.

Selection option 908 allows the user to specify shipping information (e.g., ship when order complete, hold until a designated time, and ship to a designed entity). Option 909 includes a button for saving the entered information. It is appreciated that additional screens may be used to input information and the actual saving of information can only occur after all information has been entered.

Figure 10:
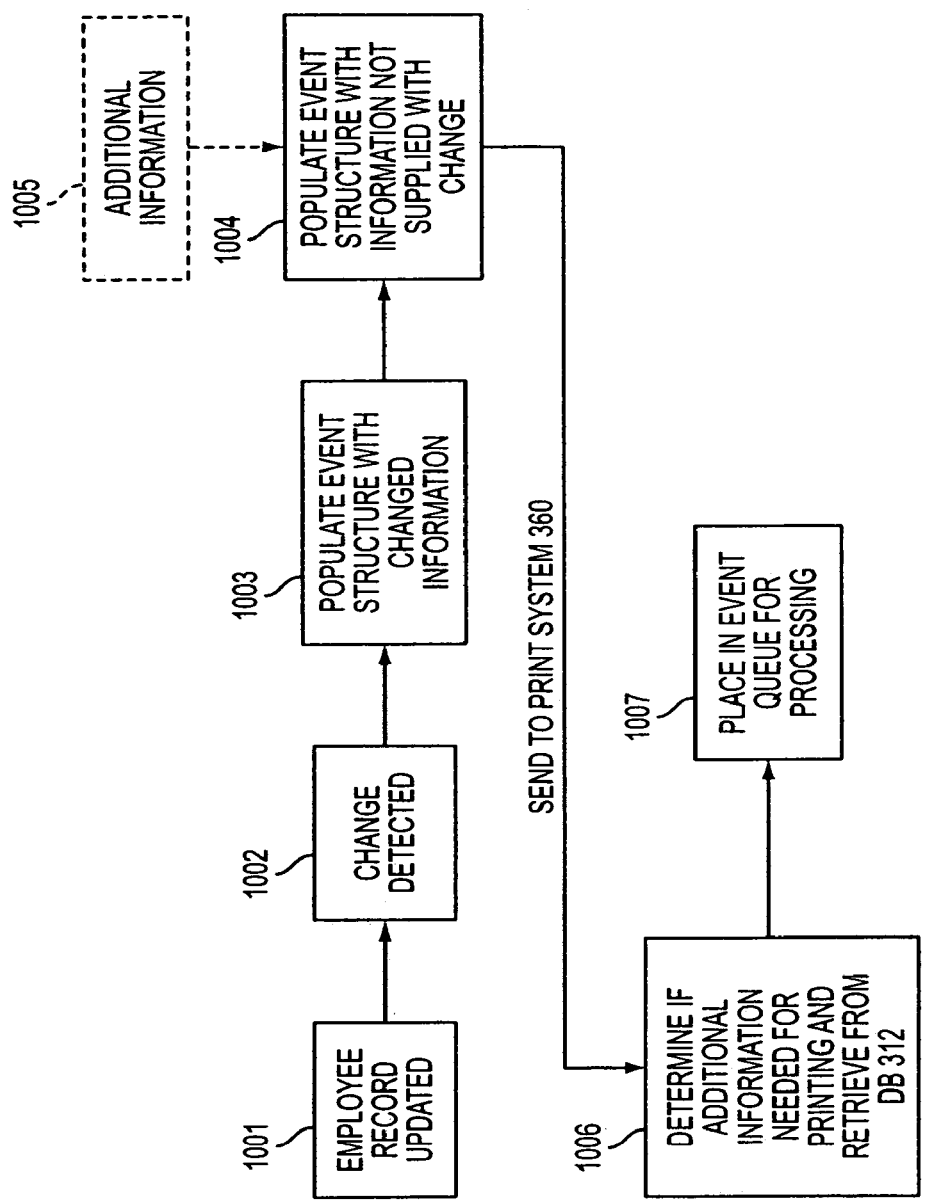
FIG. 10 shows a process for populating an event message structure.

FIG. 10 shows an example of a process for populating an event structure. In FIG. 10, an employee record is updated (step 1001). The change in the database storing the employee record is detected (step 1002). An event structure (reporting the change) is populated (step 1003) with information regarding the change as detected in step 1002. In the situation where certain additional information (not supplied with the detected change) is needed, such additional information is retrieved in step 1005 and populated into the event structure (step 1004). Alternatively, the additional population steps could be performed on the print production system side 360.

In step 1006, the event structure is checked for completeness and correctness. If additional information is needed to fulfill the print request (for example, the specific corporate logo or template to use), this information is retrieved from database 312 (step 1006) and the completed order placed in an event production queue for processing (step 1007).

Figure 11:
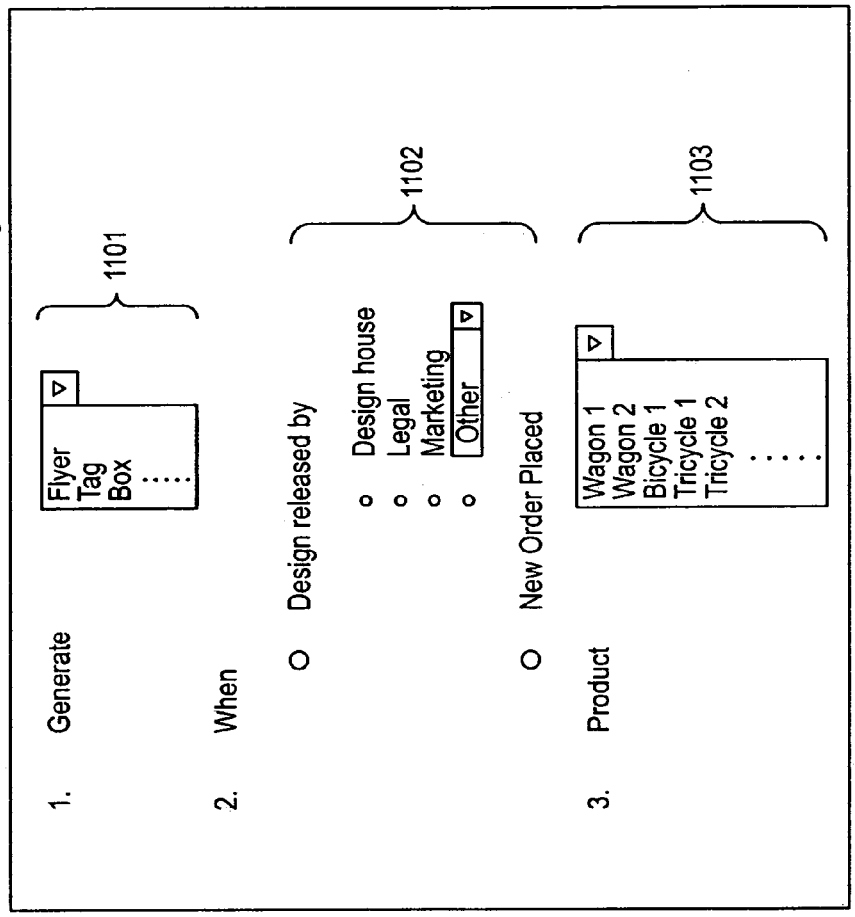
FIG. 11 shows a user interface for defining event rules relating to printing documents from information stored in a manufacturing database.

FIG. 11 shows a user interface for defining event rules relating to printing documents from information stored in a manufacturing database in accordance with embodiments of the present invention. Like the interface of FIG. 10, a first selection item 1101 allows a user to specify what printed product is to be generated when the rule fires. Interface portion 1102 allows a user to determine when the selected item in 1101 is to be printed. In some embodiments, at least two different situations are possible: the time that a design is released by one or more entities; and the time that a new product order has been placed. Selection option 1103 allows the user to select the product for which the item to be printed.

Figure 12:
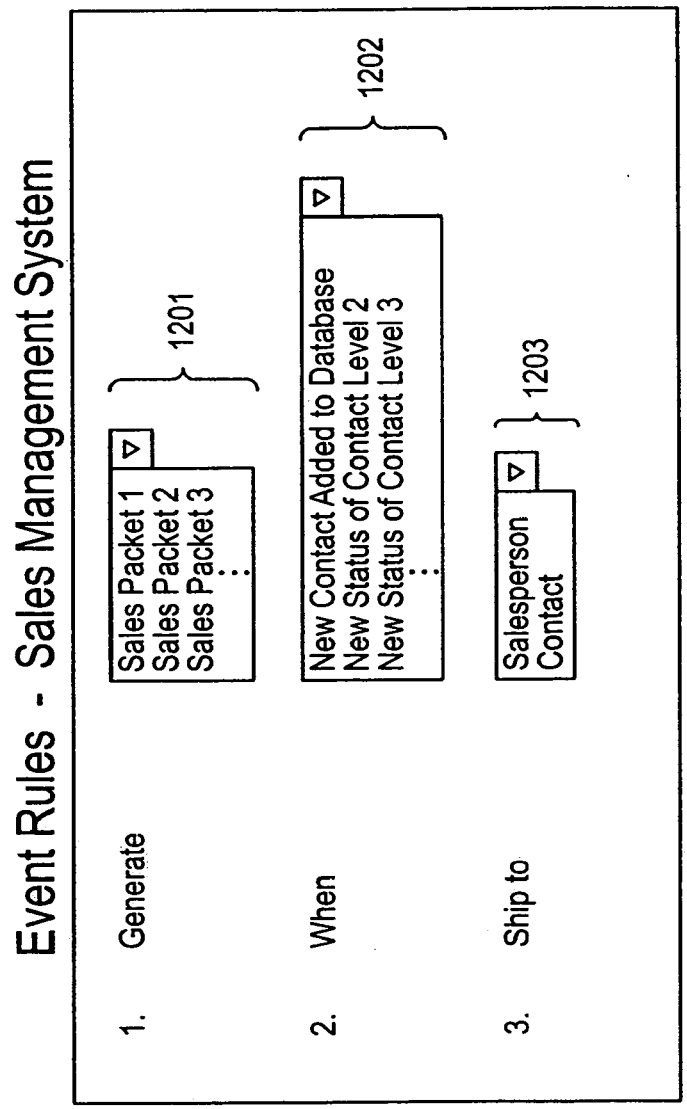
FIG. 12 shows a user interface for defining event rules relating to printing documents from information stored in a sales management system database.

FIG. 12 shows a user interface for defining event rules relating to printing documents from information stored in a sales management system database. Selection option 1201 relates to the type of sales product to be generated (for example, sales packet no. 1, sales packet no. 2, etc.). Selection item 1202 allows the user to identify the event that will trigger the rule (for example, new contact added to database, new status of contact moving to level 2, new status of contact moving to level 3, and the like). Selection option 1203 allows the user to specify where the printed product should be shipped. For example, the printed information may be shipped to the salesperson or the contact.

Figure 13:
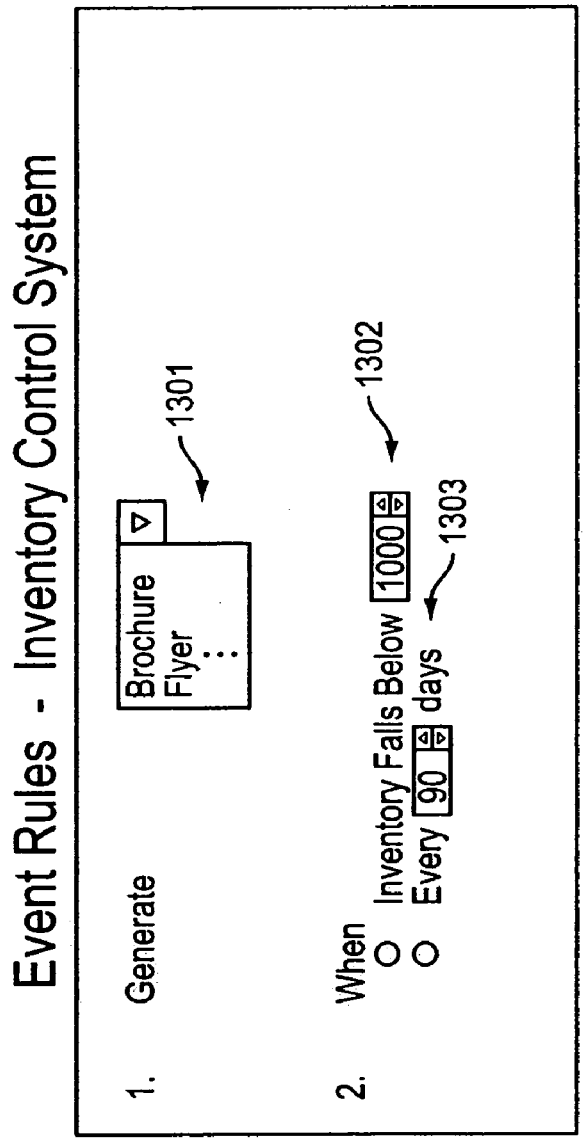
FIG. 13 shows a user interface for defining event rules relating to printing documents from information stored in an inventory control system database.

FIG. 13 shows a user interface for defining event rules relating to printing documents from information stored in a inventory control system database. User interface portion 1301 includes the type of item to be printed (for example, a flyer, a brochure, etc.). As database monitor 302 fires actions to event manager 304 through event detection 303, interface portions 1302 and 1303 indicate when an event has occurred for print processing. Interface portion 1402 allows a user to specify that an event has occurred when inventory falls below an adjustable number. In this example, database monitor 302 monitors the inventory in corporate database 301 and forwards inventory changes to event manager 304 through event detection function 303. Selection option 1303 allows the user to specify that the printed product should be generated according to a specified time interval.

Figure 14:
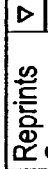
FIG. 14 shows a user interface for defining event rules relating to printing documents from information stored in a publishing system database.

FIG. 14 shows a user interface for defining event rules relating to printing documents from information stored in a publishing system database. User interface portion 1401 allows the user to select the type of item to be printed (reprints, covers for magazines, etc.). Interface portion 1402 allows the user to specify that a print order should be generated when the number of orders for a given item exceed a specified number. This could be beneficial when the set up costs for producing a small number of reprints is relatively high per reprint. By setting a minimum number of orders to be placed before executing the reprint order, the set up costs may be spread over a larger number of orders. Interface portion 1403 allows for the flushing of an order queue after a given number of weeks. For example, if a publishing house needs to complete all orders by a given time, all orders may be processed at a chosen time as specified in interface portion 1403. Interface portion 1404 allows selection of the title to be printed. The selection of the title may also include selection of a portion of the title as well. For example, one may specify to reprint an entire magazine. Alternatively, one may separately specify to reprint selected articles for the magazine. Finally, interface portion 1405 allows for the user to select a specified overrun to allow for any subsequent orders. A percentage overrun may be beneficial where the publisher knows that subsequent orders may likely be received, but wants to create a stockpile of reprints at a given time (for example, prior to receiving all orders). This allows the publisher to not have to reset presses for running a short reprint run.

Figure 15:
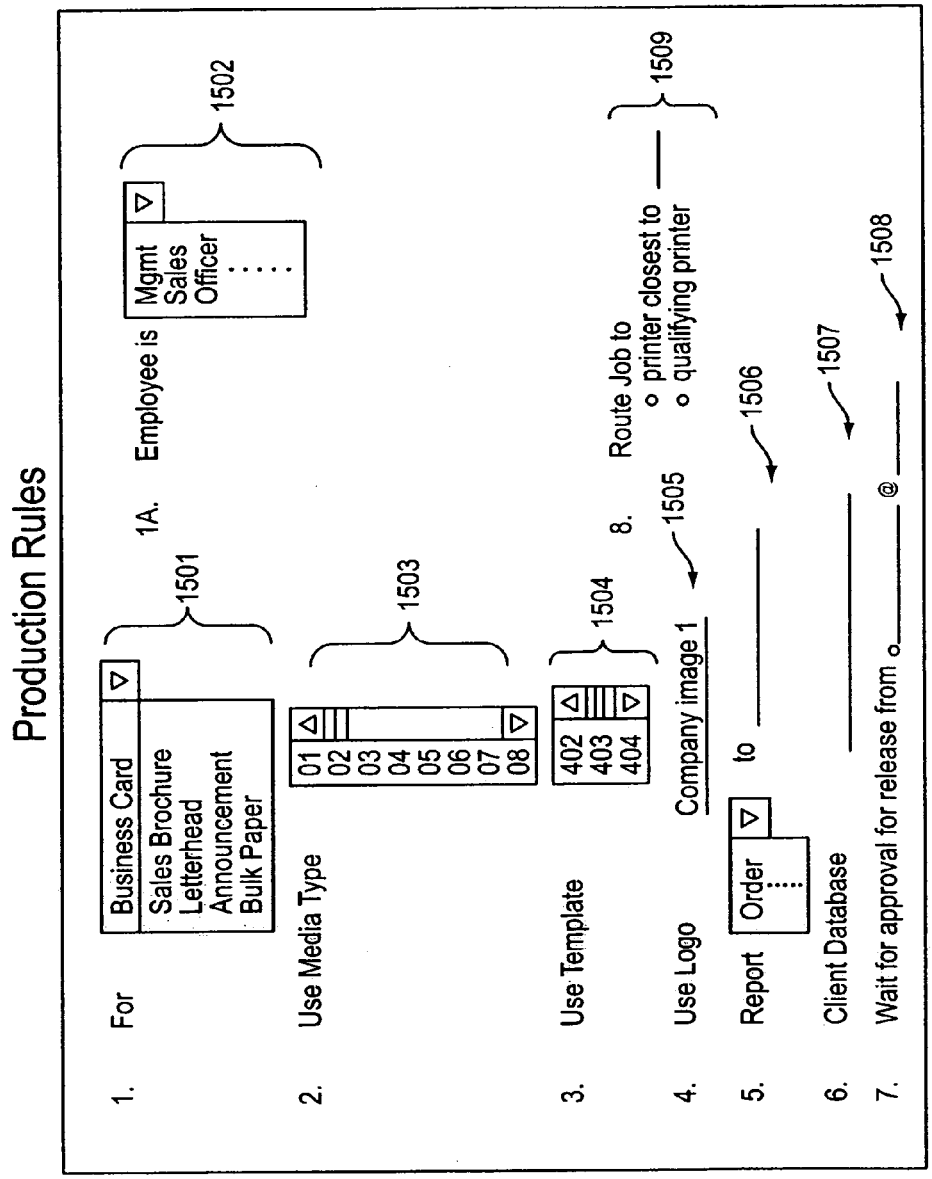
FIG. 15 shows a user interface for defining production rules for printing.

FIG. 15 shows a user interface for defining production rules for printing. User interface portion 1501 allows the user to select a specified product. These production rules may also include designation of the customer (for example, company X as opposed to company Y). Sub designations may also be made for various individuals in the company through interface portion 1502. Interface portion allows for selection of the media type for the printing of the item selected in interface portion 1501. For example, for business cards selected in interface portion 1501, the customer may wish to have one card stock for management and a different card stock for sales personnel. Interface portion 1504 allows for different templates to be specified. Interface portion 1505 allows a user to specify which logo to use for a given printed item (for example, if a blue logo is to be used for sales v. a gold-embossed logo for management). Interface portion 1506 allows for reporting (and approval, if specified, in interface portion 1508) to be made to various entities of a client. Interface portion 1507 allows for selection of a client's database that holds additional information. For example, a client may wish to maintain all content image files for printing. If the image file was not forwarded with the event as reported to event manager 304 and if the client maintains the actual image file, user interface portion 1507 allows the specification of the database. Also, for secure environments, the interface portion may include authentication and verification information 1507 needed to access the client's database. Interface portion 1508 receives user input to hold a print order until approval has been received from another entity. Finally, interface portion 1509 allows a user to select a printer based on some criteria. For example, a printer may be selected by location (close to a specified zip code) or chosen by ownership (e.g. jobs may be earmarked for printing by minority-owned businesses).

The principles of the invention can be applied to not only traditional paper printed products, but to electronic documents as well. For example, the invention can be applied to publish electronic documents and "deliver" them to Internet web pages, discussion groups, e-mail systems, collaboration portals, and to enterprise systems. All of the foregoing would be examples of database-driven means for communicating and publishing digital information.

Thus has been described various systems, methods and techniques for generating print production requests according to events that occur in a corporate database. Any of the method steps described herein can be implemented in computer software that is stored on a computer-readable medium such as a magnetic disk or CD-ROM. Many variations and alterations of the invention are of course possible. Consequently, the invention should be limited only by the appended claims and their equivalents.

The invention claimed is:

1. A method for producing a printed product in response to changes to a corporate human resources database, the method comprising the steps of:
   (1) monitoring the human resources database to detect changes corresponding to a human resources event;
   (2) in response to detecting a change in step (1), generating event data comprising information that describes the human resources event; and
   (3) in a print processing facility, receiving the event data, comparing the event data to one or more predefined event rules that determine whether the printed product should be produced and, in response to a positive determination, automatically generating a print order for the printed product using information extracted from the event data.

2. The method of claim 1, wherein step (3) comprises the step of automatically generating a procurement request that requires approval by a corporate employee; and
   further comprising the step of approving the procurement request before the printed product is produced.

3. The method of claim 2, further comprising the step of: transmitting the procurement request to a procurement system located at a corporate facility.

4. The method of claim 3, further comprising the step of transmitting the approval to the print processing facility which, in response thereto, produces the printed product.

5. The method of claim 1, wherein the print order comprises a print production request that is directly fulfilled by a print production system without further approvals.

6. The method of claim 1, further comprising the step of checking one or more print criteria that must be satisfied before the printed product is actually produced.

7. The method of claim 1, further comprising the step of notifying a corporate employee via e-mail of the print order.

8. The method of claim 7, wherein the corporate employee is specified in one of the predefined event rules.

9. The method of claim 1, further comprising the step of transmitting over the Internet the event data to the print processing facility.

10. The method of claim 1, further comprising the step of retrieving corporate-specific information in addition to the event data and using the corporate-specific information to generate a print production request.

11. The method of claim 10, wherein the corporate-specific information comprises a corporate logo that is not stored in the corporate database.

12. The method of claim 1, wherein step (3) comprises the step of generating a print production request to produce the printed product without any human intervention at the corporate facility and without any human intervention at the print production facility.

13. The method of claim 1, further comprising the step of translating at least some of the event data into a common print production request based on a schema mapping between fields in the corporate database and fields stored in the print processing facility.

14. The method of claim 1, further comprising the steps of:
   (4) monitoring a second corporate human resources database to detect changes corresponding to a second human resources event;
   (5) in response to detecting a change in step (4), generating second event data comprising information that describes the second human resources event; and
   (6) in the print processing facility, receiving the second event data, comparing the second event data to one or more predefined event rules that determine whether the printed product should be produced and, in response to a positive determination, automatically generating a second print order for the printed product using information extracted from the second event data.

15. The method of claim 1, wherein the human resources event comprises the addition of a new employee to the corporation.

16. The method of claim 15, wherein the print order comprises an order to print business cards for the new employee.

17. The method of claim 1, further comprising the step of creating the one or more event rules by specifying parameters on a computer screen.

18. A system producing a printed product in response to changes in a corporate human resources database, the system comprising:
- a computer-implemented database monitor located at a corporate facility, wherein the database monitor detects changes to the corporate human resources database corresponding to a human resources event and, in response thereto, generates event data comprising information that describes the human resources event; and
- a print processing facility, located at a geographic location different from the corporate location and coupled to the database monitor over a network, wherein the print processing facility receives the event data, compares the event data to one or more predefined event rules that determine whether the printed product should be produced and, in response to a positive determination, automatically generates a print order for the printed product using information extracted from the event data.

19. The system of claim 18, wherein the print order comprises a procurement request that requires further approval by a corporate employee before the printed product is produced.

20. The system of claim 18, wherein the procurement request is approved in a procurement system located at the corporate facility, and wherein the print processing facility transmits the procurement request to the procurement system for approval by the corporate employee.

21. The system of claim 20, wherein the procurement system transmits the approval to the print processing facility which, in response thereto, produces the printed product.

22. The system of claim 18, wherein the print order comprises a print production request that is directly fulfilled by a print production system without further approvals.

23. The system of claim 18, wherein the print order comprises one or more print criteria that must be satisfied before the printed product is actually produced.

24. The system of claim 18, wherein the print processing facility notifies a corporate employee via e-mail of the print order.

25. The system of claim 18, wherein the corporate employee is specified in one of the predefined event rules.

26. The system of claim 18, wherein the database monitor and the print processing facility communicate over the Internet.

27. The system of claim 18, wherein the print processing facility retrieves corporate-specific information in addition to the event data and uses the corporate-specific information to generate a print production request.

28. The system of claim 27, wherein the corporate-specific information comprises a corporate logo that is not stored in the corporate database.

29. The system of claim 18, wherein the print processing facility generates a print production request to produce the printed product without any human intervention at the corporate facility and without any human intervention at the print production facility.

30. The system of claim 18, wherein the print processing facility translates at least some of the event data into a common print production request based on a schema mapping between fields in the corporate human resources database and fields stored in the print processing facility.

31. The system of claim 18, wherein the printed product comprises business cards for a new employee.

32. A print processing facility coupled to a plurality of corporate locations each comprising a human resources database, wherein the print processing facility receives from each of the plurality of corporate locations event data describing a human resources event, compares the event data to one or more predefined event rules that determine whether a printed product should be produced and, in response to a positive determination, automatically generates a print order for the printed product using information extracted from the event data.

33. The print processing facility of claim 32, wherein the human resources event comprises the addition of a new employee, and wherein the printed product comprises business cards for the new employee.

* * * * *